United States Patent [19]

Shima et al.

[11] Patent Number: 4,831,542

[45] Date of Patent: May 16, 1989

[54] METHOD FOR INSPECTION OF CUTTING LOCUS CONTROL PROGRAM

[75] Inventors: Atsushi Shima, Suginami; Toshiaki Otsuki, Hino, both of Japan

[73] Assignee: Fanuc Ltd, Minamitsuru, Japan

[21] Appl. No.: 64,585

[22] Filed: Jun. 22, 1987

Related U.S. Application Data

[63] Continuation of Ser. No. 717, 174, filed as PCT JP84/00381 on Jul. 27, 1984, published as WO85/00678 on Feb. 14.

[30] Foreign Application Priority Data

Jul. 29, 1983 [JP] Japan ................................ 58-138996

[51] Int. Cl.⁴ .......................... G06F 15/46; G06F 3/14
[52] U.S. Cl. ............................... 364/474.26; 364/522; 364/188; 340/729
[58] Field of Search .............................. 364/167–171, 364/474, 475, 188, 189, 191–193, 521, 522; 340/729

[56] References Cited

U.S. PATENT DOCUMENTS 3,621,214 11/1971 Romney et al. .................... 340/729
4,549,275 10/1985 Sukonick .............................. 340/729

Primary Examiner—John R. Lastova
Attorney, Agent, or Firm—Staas & Halsey

[57] ABSTRACT

For reliably and easily judging whether or not a cutting locus is correct, which locus has been set in a cutting locus or tool path control program, which program has a step of commanding the rotational angle of a rotary table carrying a workpiece and a step of commanding the locus of a cutter corresponding to each rotational angle commanding step. A rotational angle range for displaying the locus of the cutter is set through a keyboard or the like. A CPU causes a display only if the locus of the cutter is within the set range.

7 Claims, 4 Drawing Sheets

CRT DISPLAY

METHOD FOR INSPECTION OF CUTTING LOCUS CONTROL PROGRAM

This is a continuation of co-pending application Ser. No. 717,174 filed as Pct JP84/00 381 on Jul. 27, 1984, published as WO85/CO678 on Feb. 14, 1988, now abandoned.

BACKGROUND OF THE INVENTION

The present invention relates to a method for inspection of a cutting locus control program for a numerical control system.

A cutting locus control program or tool path program for use in cutting a workpiece while rotating it (for example, in the case of drilling a hole in each face of a cube), usually comprises a step of commanding the rotational angle of a rotary table carrying the workpiece and a step of describing the locus or tool path of a cutter for each rotational angle. Incidentally, the step of commanding the rotational angle in the case of drilling a hole in each face of a cube is a step of, for instance, rotating the rotary table 90° in the forward direction with respect to a reference position. Conventionally, in order to inspect whether or not the cutting locus for each rotational angle has been set correctly in such a cutting locus control program, a cutting locus described in a cutting program is displayed on a CRT through the use of an inspection program and judged by visual inspection. With this conventional method, however, since cutting loci for respective rotational angles are displayed one above another on the CRT, the judgement is difficult to make when the cutting locus differs with each rotational angle and the number of rotational angles is large. For example, in the case of drilling a hole in each face of a cube, it is difficult to make the decision since the loci of the cutter in the respective faces are displayed one above another on the CRT.

SUMMARY OF THE INVENTION

An object of the present invention is to provide a method for inspection of a cutting locus control program with which it is possible to reliably decide whether the cutting locus of a cutter has been set correctly.

According to the present invention, a rotational angle range for displaying the cutting locus of a cutter is set through a keyboard or the like and only the cutting loci or tool path of the cutter corresponding to the rotational angles within the set range are selectively displayed on the CRT. Therefore, according to the present invention, since cutting loci are not displayed one above another on the CRT, it can be decided with certainty and with ease whether each cutting locus has been set correctly.

DESCRIPTION OF THE PREFERRED EMBODIMENT

Figure 1:
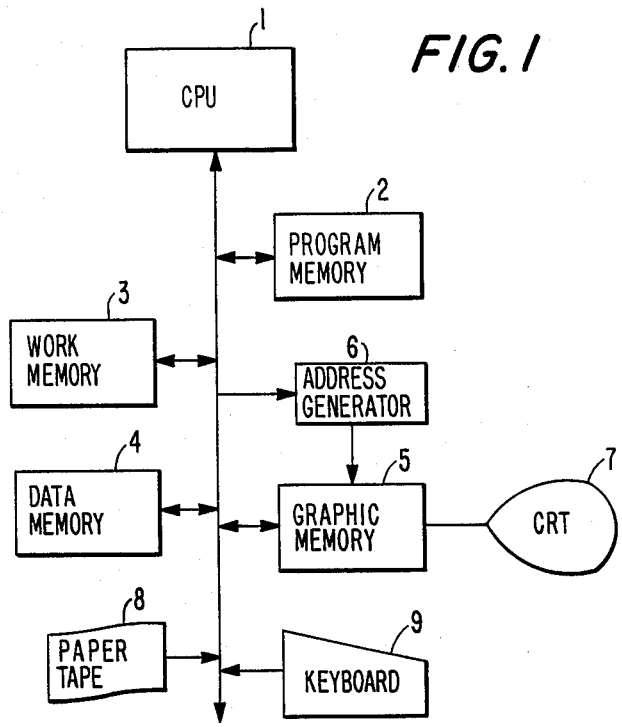
FIG. 1 is a block diagram illustrating the arrangement of an inspection system to which an embodiment of the present invention is applied.

FIG. 1 is a block diagram illustrating the arrangement of a program inspection system to which an embodiment of the present invention is applied. Reference numeral 1 indicates a CPU, 2 a program memory, 3 a work memory, 4 a data memory, 5 a graphic memory, 6 an address generator, 7 a CRT, 8 a paper tape input device and 9 a keyboard.

At first, an inspection program and a cutting locus control program (tool path program) to be inspected are entered from the paper tape input device 8 and stored through the CPU 1 in the program memory 2 and the data memory 4, respectively, and the rotational angle range intended for inspection is written in a predetermined area of the data memory 4 from the keyboard 9 through the CPU 1.

Figure 2:
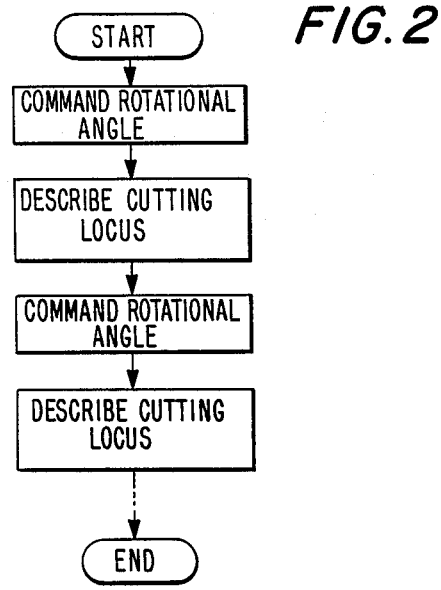
FIG. 2 is a flowchart showing the outline of a cutting locus control program to be inspected.

The cutting locus control program consists of sets of a step of commanding the rotational angle of the rotary table carrying a workpiece and a step of describing the locus of the cutter at the commanded rotational angle, as shown in FIG. 2. A program which describes the locus (the cutting locus) of the cutter consists of a number of steps of specifying the starting point of the locus and specifying an increment of displacement from the starting point or the preceding end point, or the end point (in absolute value) of each segment in the locus.

Figure 3:
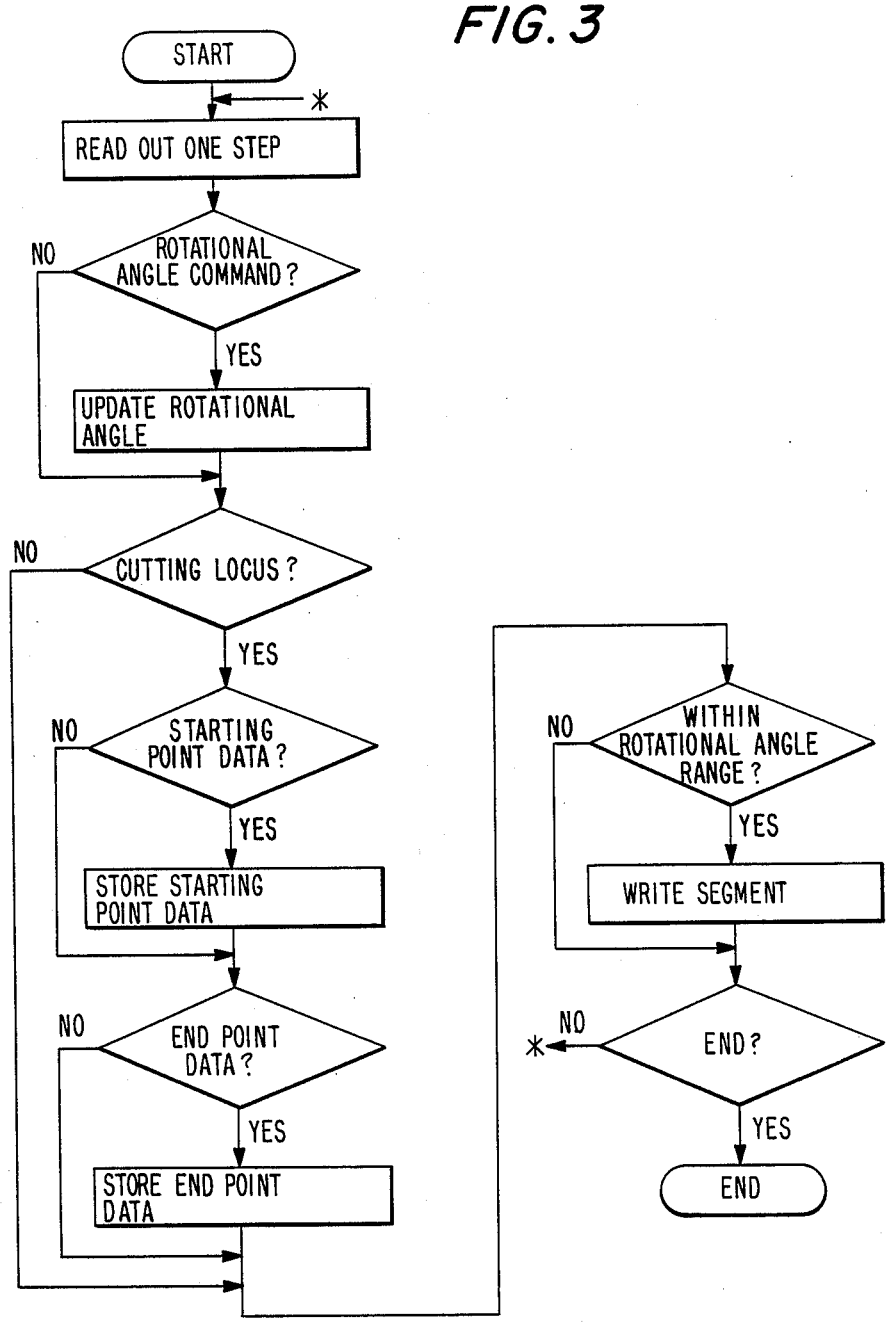
FIG. 3 is a flowchart showing the outline of an inspection program.

The CPU 1 performs the operations shown in the flowchart of FIG. 3 following the inspection program stored in the program memory 2.

At first, the CPU 1 reads out one step of the cutting locus control program from the data memory 4 and decides whether the step is a rotational angle command step. If the step is the rotational angle command step, then the CPU writes the rotational angle in a dedicated area provided in the work memory 3, thereby updating a previously stored rotational angle. If the step read out is not the step of commanding the rotational angle, then updating of the rotational angle does not take place.

Next, it is decided whether or not the step read out of the data memory 4 is a step of describing the cutting locus. If it is the step of describing the cutting locus, then it is decided whether the data is locus starting point data, and if so, the starting point data is stored in a dedicated area provided in the work memory 3. If not, the above operation is not carried out.

Next, it is decided whether one step read out of the data memory 4 is incremental data. If it is incremental data, then the incremental data is added to the starting point data read out of the work memory 3 to calculate end point data of the segment in the cutting locus, and the calculated value is stored in a dedicated area provided in the work memory 3.

After this, comparison is made between the current rotational angle read out of the work memory 3 and the rotational angle range stored in the data memory 4 for inspection. If the current rotational angle is within the specified range, then the starting point data and the end point data just produced, or the previously produced end point data and the currently produced end point data are read out of the work memory 3, and a segment interconnecting both is written into the graphic memory 5. On the other hand, if the current rotational angle is outside the specified range, then no segment is written in the graphic memory 5, and it is decided whether the cutting locus control program under inspection has ended. If not, the process returns to the point marked with an asterisk in FIG. 3 and the next step is read out of the data memory 4 and then the abovesaid operation is repeated until the program ends.

As described above, the cutting locus within the desired rotational angle range, written into the graphic memory 5, is periodically read out by an address supplied from the address generator 6 and is displayed on the CRT 7.

Accordingly, for instance, in the case of inspecting a cutting locus control program for drilling a hole in each face of a cube, if 90° is entered from the keyboard 9, only the locus of the cutter in one face (a first face) of the cube can be displayed on the CRT 7, and if 180° is entered from the keyboard 9, only the locus of the cutter in a second face perpendicularly intersecting the first face can be displayed. Accordingly, the cutting locus control program can be inspected accurately and easily.

The table below illustrates a tool path control program which rotates a workpiece to four different positions at which different machining paths are follows.

TABLE I

| | |
| --- | --- |
| O1000; | |
| G90 X0 Y0 Z0; | |
| B0; | rotary table 9° |
| G00 Z-100.0; | |
| G02 G91 X100.0 I50.0 F200; | |
| G01 Y100.0 | |
| G02 X-100.0 I-50.0; | |
| G01 Y100.0; | |
| G90 G00 Z0; | |
| B90.0; | rotary table 90° |
| G00 Z-100.0; | |
| G01 G91 X100.0; | |
| G02 Y100.0 J50.0; | |
| G01 X-100.0; | |
| G02 Y-100.0 J-50.0; | |
| G90 G00 Z0; | |
| B180.0; | rotary table 180° |
| G00 Z-100.0; | |
| G03 G91 X100.0 I50.0 | |
| G01 Y100.0 | |
| G03 X-100. I-50.0; | |
| G01 Y-100.0; | |
| G90 G00 Z0; | |
| B270.0; | rotary table 270° |
| G00 Z-100.0; | |
| G01 G91 X100.0; | |
| G03 Y100.0 J50.0; | |
| G01 X-100.0; | |
| G03 Y-100.0 J-50.0; | |
| G90 G00 Z0; | |
| M02; | |

Figure 4:
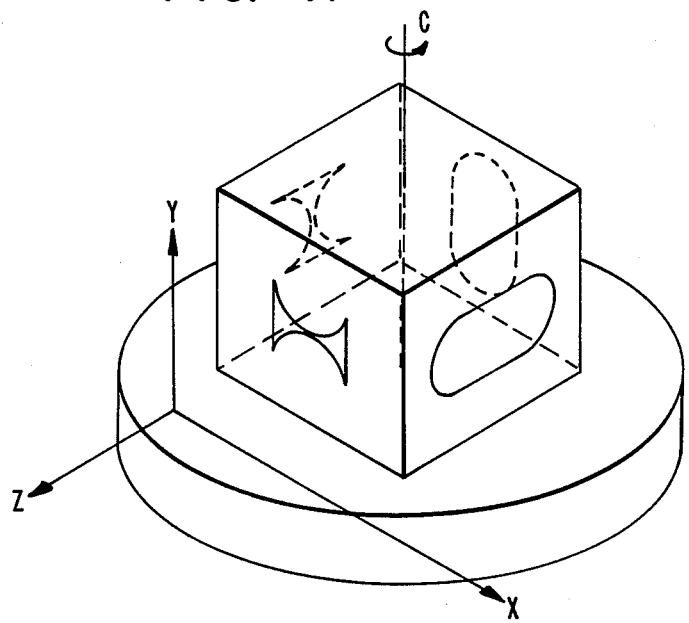
FIG. 4 depicts cutting shapes for to be displayed.
Figure 5:
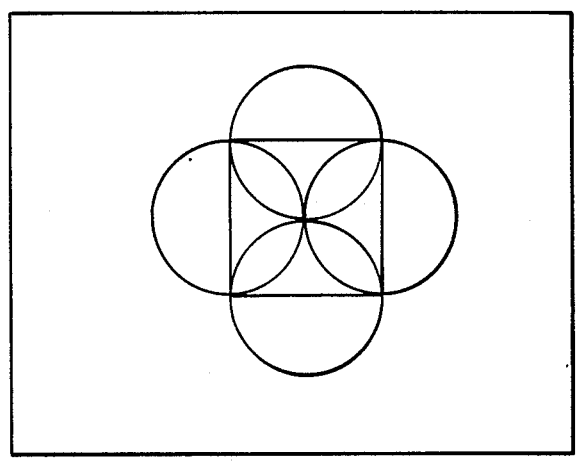
FIG. 5 shows a prior art display.
Figure 6A:
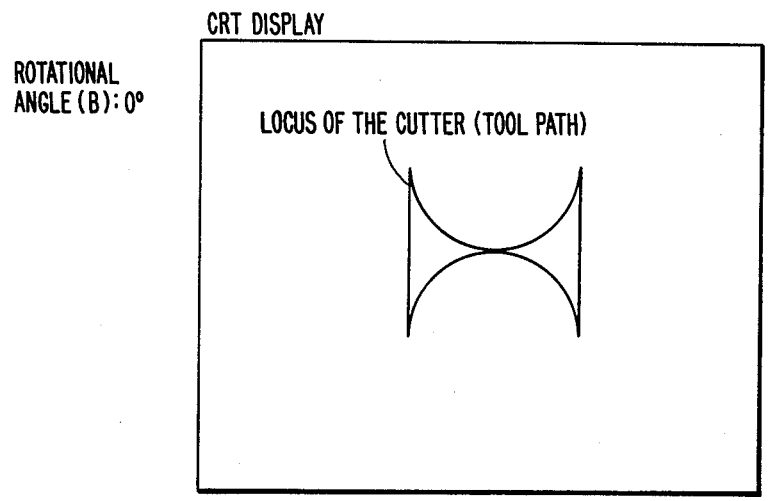
FIGS. 6A and 6B illustrate displays according to the present invention.
Figure 6B:
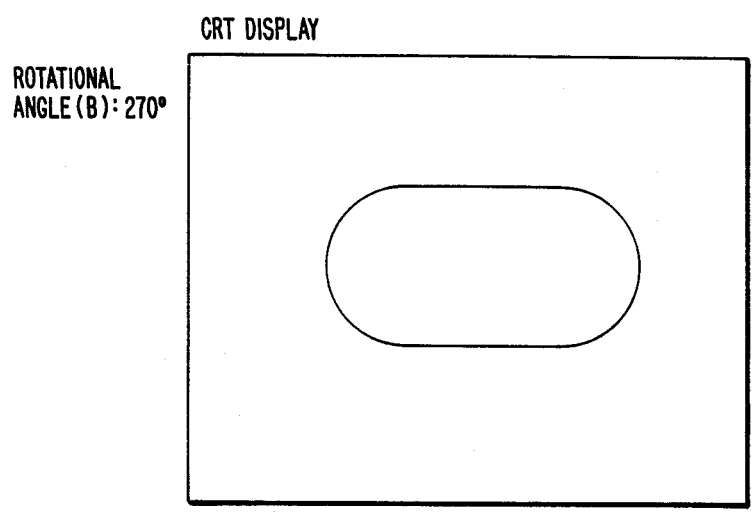

FIG. 4 illustrates the different tool paths followed on a workpiece by the program illustrated in Table I. FIG. 5 illustrates how the tool paths of FIG. 4 would appear in a prior art display. As can be seen from FIG. 5, all the tool paths are shown at the same time, that is overlapping. Simultaneous display merges the rotational angle and prevents a specific tool path from being visually confirmed for correctness. FIGS. 6A and 6B illustrate two of the displays which are produced by the present invention. As can be seen from FIGS. 6A and 6B, only the tool path associated with the particular rotational angle is displayed allowing each tool path to be visually verified. This capability is not possible with the prior art display as illustrated in FIG. 5.

As described above, since the present invention is constituted so that a predetermined range is set for the rotational angle and only loci or the tool path of a cutter corresponding to the rotational angles within the set range are selectively displayed on a CRT, the invention has the advantage that it can easily be decided whether the cutting locus has been correctly set.

We claim:

1. A method for inspection of a tool path control program, comprising the steps of:
   (a) setting a predetermined rotational angle range;
   (b) commanding a rotational angle of a rotary table carrying a workpiece;
   (c) describing a tool path for machining said workpiece for each said commanded rotational angle; and
   (d) displaying on a CRT only tool paths corresponding to each respective commanded rotational angle that are within said predetermined rotational angle range.

2. The method of claim 1, further comprising performing steps (b) commanding and (c) describing, for a respective plurality of different commanded rotational angles and tool paths of a cutter, and
   performing step (a) of setting said predetermined rotational angle range a plurality of times to have different respective values for the respective different commanded rotational angles.

3. A device for inspecting a path control program having tool paths, said device comprising:
   a CPU for performing said tool path control program,
   a memory for storing the tool paths, storing a rotational angle range, and storing a commanded rotational angle for each tool path, and
   display means for displaying only tool paths for each said commanded rotational angle that are within the respective rotational angle range.

4. A method of inspecting a tool path control program with tool paths for machining a workpiece, each path being specified by a corresponding program rotational angle, said method comprising the steps of:
   (a) storing an entered rotational angle;
   (b) scanning the program for the corresponding program rotational angle; and
   (c) displaying only the tool paths corresponding to the entered rotational angle responsive to the corresponding program rotational angle.

5. A method as recited in claim 4, further comprising storing another entered rotational angle, the rotational angles producing a rotational angle range and displaying step (c) displaying only tool paths within the rotational angle range responsive to the program rotational angles.

6. An apparatus for inspecting a tool path control program with tool paths for machining a workpiece, each path being specified by a corresponding program rotational angle, said apparatus comprising:
   input means for inputting an entered rotational angle;
   processing means for scanning the program for program rotational angles, comparing the program rotational angles with the entered rotational angle and storing only the corresponding tool path when the program rotational angle and the entered rotational angle match; and
   display means for displaying only the stored tool path.

7. An apparatus as recited in claim 6, said input means inputting another rotational angle, the rotational angles producing a rotational angle range and said processing means storing only tool paths with program rotational angles within the rotational angle range.

* * * * *

UNITED STATES PATENT AND TRADEMARK OFFICE
CERTIFICATE OF CORRECTION

PATENT NO. : 4,831,542

DATED : May 16, 1989

INVENTOR(S) : Atsushi Shima et al.

It is certified that error appears in the above-identified patent and that said Letters Patent is hereby corrected as shown below:

FRONT PAGE, Col. 2, [56] References Cited
   Please delete this section in its entirety, and in place thereof insert the correct section:

--[56] References Cited
      U.S. PATENT DOCUMENTS

| | | | |
|---|---|---|---|
| 3,621,214 | 11/1971 | Romney et al. | .340/729 |
| 4,365,300 | 12/1982 | Johanson et al. | .364/474 |
| 4,423,481 | 12/1983 | Reid-Green et al. | .364/167 |
| 4,521,860 | 6/1985 | Kanematsu et al | .364/474 |
| 4,549,275 | 10/1985 | Sukonick. | .340/729--. |

[57] ABSTRACT line 2, "locus is" s/b --locus or tool path is--;

line 3, delete "or tool path".

Col. 1, line 6, "WO85/C0678" s/b --WO85/00678--;

Col. 4, line 17, "steps (b)" s/b --said steps of (b)--;

line 20, after "performing" insert --said--;

UNITED STATES PATENT AND TRADEMARK OFFICE
CERTIFICATE OF CORRECTION

PATENT NO. : 4,831,542

DATED : May 16, 1989

INVENTOR(S) : Atsushi Shima et al.

It is certified that error appears in the above-identified patent and that said Letters Patent is hereby corrected as shown below:

Col. 4, line 46, after "and" insert --said--;
       line 55, after "for" (second occurrence) insert --the--.

Signed and Sealed this

Twentieth Day of March, 1990

Attest:

JEFFREY M. SAMUELS

Attesting Officer

Acting Commissioner of Patents and Trademarks